M. J. KLEIN.
DISTANCE AND SPEED METER.
APPLICATION FILED OCT. 29, 1910.
1,019,007.
Patented Feb. 27, 1912.
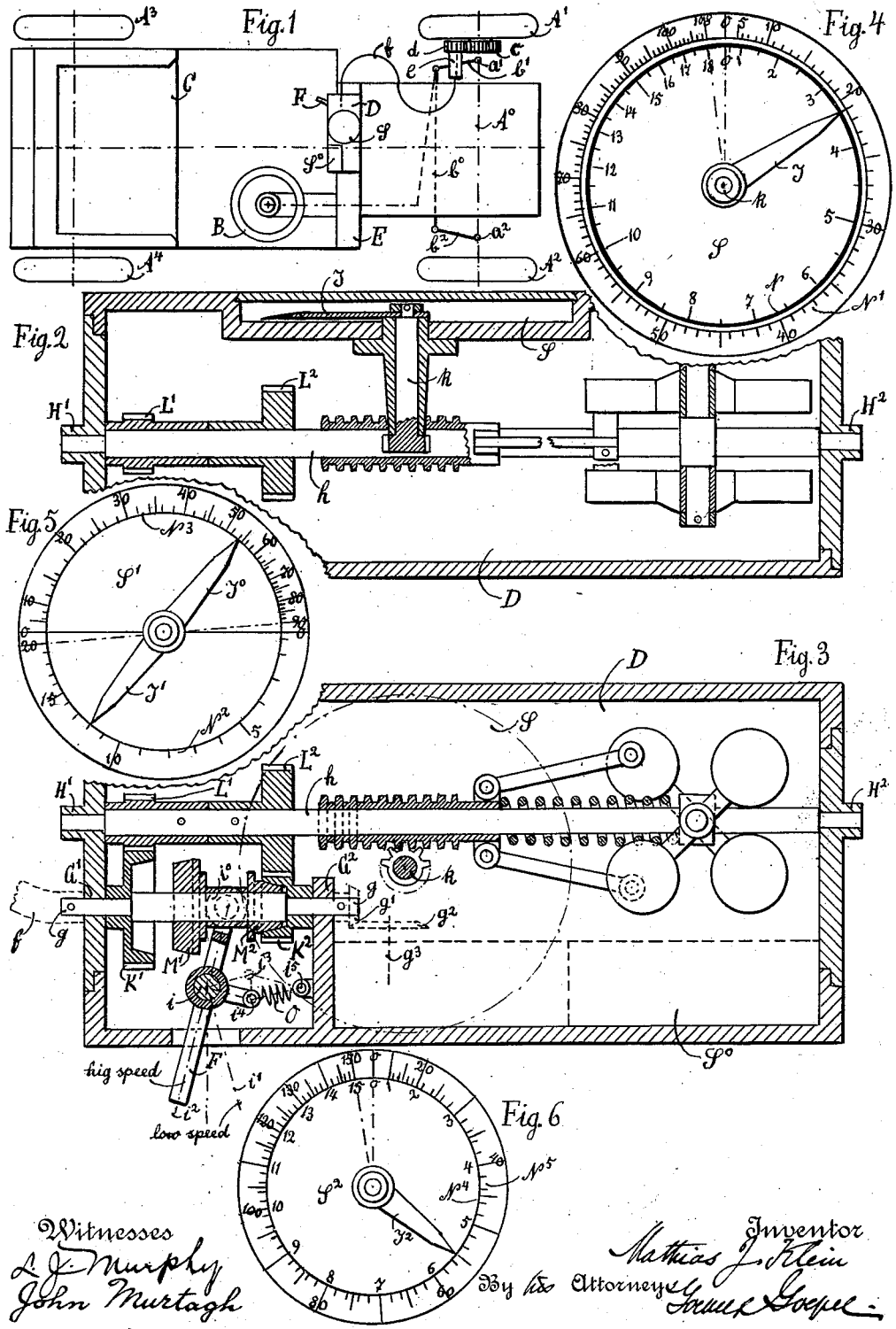

UNITED STATES PATENT OFFICE.

MATHIAS J. KLEIN, OF NEW YORK, N. Y., ASSIGNOR OF SIXTY ONE-HUNDREDTHS TO HUGO B. ROELKER, OF NEW YORK, N. Y.

DISTANCE AND SPEED METER.

1,019,007. Specification of Letters Patent. Patented Feb. 27, 1912.

Application filed October 29, 1910. Serial No. 589,723.

*To all whom it may concern:*

Be it known that I, MATHIAS J. KLEIN, a citizen of the United States of America, residing in New York, borough of Manhattan, in the county and State of New York, have invented certain new and useful Improvements in Distance and Speed Meters, of which the following is a specification.

This invention relates to indicators for automobiles, motor-cycles and other vehicles; its object being to indicate the distance which the vehicle has traveled within a given time, and to indicate at any moment the correct vehicle-speed—whether it be very low or very high—not only on straight, level and smooth roads, but also on curves and banked and more or less rough roads.

I prefer speedometers of the centrifugal type, but, without more or less complicated arrangements, they give very uneven scale divisions, and their range of action is limited; if they show low vehicle-speeds correctly, they will show the very high vehicle speeds not at all or very incorrectly, and if they show the high speeds correctly, they show the low speeds more or less incorrectly or not at all. The said uneven scale-divisions however have to a certain extent some advantages, because they should be larger for small speeds than for high speeds, as the latter are not so often used as the former ones. The range of action of the speedometer, I have increased in my former application for a "balanced speedometer", Serial No. 547,466, filed March 5, 1910, by using two or more main-springs, resisting the centrifugal force of the fly-balls of the revolving speedometer-shaft. In the present application I obtain the same result (increasing the range of action of the speedometer), by adding to any balanced speedometer of the centrifugal type, a two speed gear-clutch with a hand-lever, and a second scale on its dial; said hand-lever being shifted by the vehicle-driver, whereby said gear-clutch gives the main revolving shaft of the speedometer two different speeds for each vehicle-speed, so that the index-hand shows on the two scales of the dial the corresponding vehicle-speeds.

In the accompanying drawing, Figure 1 is a plan-view of a four wheeled motor-vehicle; Figs. 2 and 3 are respectively a vertical longitudinal section and a horizontal section (parts being shown in elevation) of a balanced speedometer of the centrifugal type and a distance meter, provided with my improvements; Fig. 4 shows the dial (with its two scales and one index hand) of the speedometer; Fig. 5 shows a modification of the dial, having two scales and two index-hands; Fig. 6 shows another modification of the dial, with one index-hand and having its two scales combined in one scale.

Similar letters of reference indicate corresponding parts in all figures.

In four wheeled auotmobile, Fig. 1, $A'$, $A^2$ are the front steering road wheels and $A^3$, $A^4$ the power-wheels; B is the steering hand wheel, C the seat and D the distance and speedometer connected to the dashboard E; the steering road wheels $A'$, $A^2$ and levers $b'$, $b^2$ connected by rod $b^0$, turn around the points $a'$, $a^2$ of the front axle $A^0$ respectively, whenever the hand gear-wheel B is turned by the vehicle-driver, and thereby the vehicle is steered to the right or left; the shaft of gear-wheel $d$ revolves in bracket $e$ which is connected to the lever-arm $b'$; the gear-wheel $c$ attached to the steering road wheel $A'$ turns gear-wheel $d$ and transmits by means of flexible shaft $f$, the motion of wheel $A'$ to the shaft $g$ of the speedometer D (Fig. 3); $G'$, $G^2$ are the bearings of shaft $g$ and $H'$, $H^2$ the bearings of the main revolving shaft $h$ of the speedometer; the gear-wheels $K'$, $K^2$ turn loosely around shaft $g$, while the gear-wheels $L'$, $L^2$ are connected to shaft $h$; $L'$ meshes with $K'$ and $L^2$ with $K^2$; the hollow shaft of the cones $M'$, $M^2$ can be shifted on shaft $g$ parallel to the latter, but is prevented from turning around $g$ in any suitable manner. The hand-lever F oscillating around shaft $i$ is forked on the one end and carries there two rollers $i^0$; by shifting of lever F said rollers bring the outer surface $h$ of the cones $M'$, $M^2$ in coöperation with the similar cone surfaces in $K'$ and $K^2$ respectively; the arm $i$, $i^4$ is connected to lever F through shaft $i$; the compressed spring O turns at its ends around $i^5$ (connected to the casing) and $i^4$ respectively; by shifting of hand lever F from position $i$ $i^2$ to position $i$ $i'$, the arm $i$ $i^4$ goes to position $i$ $i^3$, the spring O from position $i^5$ $i^4$ to $i^5$ $i^3$, and said spring O presses the cone $M'$ (by means of rollers $i^0$) into engagement with the corresponding cone-surface of gear-wheel $K'$; the friction between the cone-surfaces compels $K'$ to make the same number of revolutions per minute as the shaft $g$ is making; and when lever F is shifted to position $i$ $i^2$, the cone-surface of $M^2$ presses against the cone surface of wheeel $K^2$, and the latter makes the same number of revolutions as shaft $g$. The gear-wheel $K'$ is larger in diameter than gear-wheel $L'$, and the diameter of $K^2$ is smaller than the diameter of $L^2$; therefore shaft $h$ makes more revolutions per minute than shaft $g$, when hand lever F is in position $i$ $i'$, and $h$ makes a less number of revolutions than $g$, when F is in position $i$ $i^2$.

The outer part of the balanced speedometer may be of any design, for instance like the one shown in my application beforementioned; its dial S (Fig. 4) however must have two scales N and N' corresponding to the two positions of hand lever F; the latter in position $i$ $i'$ shows the low vehicle speeds by index hand I on the inside scale N of dial S; lever F may be shifted at any time to position $i$ $i^2$, when the vehicle speed increases and index hand I comes more or less near to its upper speed mark, and then the high vehicle speeds are shown on the outer scale N' of dial S by the same index hand I. High speed to low speed, for any position of I have a fixed proportion, here (Fig. 4) it is 6 to 1; the low speed scale goes up to 18 miles and the high speed scale to 108 miles per hour. If index hand I shows $3\frac{1}{2}$ miles vehicle speed on the inside scale N (corresponding to position $i'$ of lever F), it shows at the same time 21 miles speed on the outside scale N' (corresponding to position $i^2$ of lever F).

Fig. 5 shows a modification of the dial—it has two scales $N^2$ $N^3$, and two index hands I' and $I^0$. I' shows the low vehicle speeds (1 to 20 miles) on scale $N^2$, when hand lever F is in position $i'$, and $I^0$ shows the high vehicle speeds (5 to 90 miles) on scale $N^3$, when lever F is in position $i^2$; high to low speeds are here $4\frac{1}{2}$ to 1; if I' shows 12 miles low speed, $I^0$ shows at the same time 54 miles high speed.

Fig. 6 shows another modification of the dial with one index hand $I^2$; the two scales, $N^4$, $N^5$ are practically only one scale, as the proportion low speed to high speed is 1 to 10 (low speed goes up to 15 miles and high speed to 150 miles). The 1/10 of a mile of the inside low speed scale $N^4$ represents a full mile on the outside high speed scale $N^5$. If $I^2$ shows 5.5 that is $5\frac{1}{2}$ miles low speed on scale $N^4$ (corresponding to position $i'$ of hand lever F), $I^2$ shows at the same time 55 miles high speed on scale $N^5$ (corresponding to position $i^2$ of lever F). Instead of the two speed gear-clutch shown in the drawing, any equivalent construction may be used. It is clear that by this method (as above described) the range of action of the speedometer may be considerably increased.

The bevel-gear $g'$ on shaft $g$ (Fig. 3) moves the bevel gear $g^2$ on shaft $g^3$, the latter transmits its motion to the distance meter or odometer $S^0$, which may be of any design; it has two registers, a season and a trip-register, the latter may be set to 0 at any time.

Having thus described my invention, I claim as new and desire to secure by Letters Patent:

1. A speedometer of the centrifugal type, comprising a rotary shaft, a dial, an index-hand, means between said shaft and index-hand for moving the latter over said dial as the speed of rotation of the rotary shaft changes, mechanism for transmitting rotary motion to the rotary shaft, and a shiftable device coöperating with said mechanism for driving the rotary shaft at different speeds for a given speed of the road-wheels.

2. A speedometer of the centrifugal type, comprising a rotary shaft, a dial having two scales, an index-hand, means whereby the index-hand is adapted to be moved over said scales on changes of speed of said shaft, clutch gear-wheels operatively connected to said shaft, means for connecting the clutch gear-wheels operatively with the shaft, a shiftable clutch, and a hand-lever for shifting the clutch into or out of engagement with said gear-wheels.

3. A speedometer of the centrifugal type, comprising a rotary shaft, a dial with two scales, an index-hand adapted to be moved over said dial, means for transmitting motion from the rotary shaft to the index-hand as the speed of rotation of the rotary shaft changes, two gear-wheels of different diameters on said shaft, a clutch-shaft, loose gear-wheels on said clutch-shaft meshing with the gear-wheels on its rotary shaft, and provided with cone-surfaces, a shiftable clutch between said clutch gear-wheels provided with coöperating cone-surfaces, and a hand-lever for shifting the clutch into engagement with one or the other of said clutch gear-wheels for imparting two different speeds to the rotary shaft for the same speed of the vehicle and indicating the two different speeds on the scales of the dial.

In testimony, that I claim the foregoing as my invention, I have signed my name in presence of two subscribing witnesses.

MATHIAS J. KLEIN.

Witnesses:
PAUL GOEPEL,
JOHN MURTAGH.